United States Patent [19]

Tamas

[11] Patent Number: 4,682,751
[45] Date of Patent: Jul. 28, 1987

[54] BATTERY MOUNTING DEVICE
[75] Inventor: Attila J. Tamas, Portage, Mich.
[73] Assignee: Clark Equipment Company, South Bend, Ind.
[21] Appl. No.: 835,482
[22] Filed: Mar. 3, 1986
[51] Int. Cl.⁴ ............................................. A47B 97/00
[52] U.S. Cl. .................................. 248/503; 248/505; 180/68.5
[58] Field of Search .............. 248/503, 505, 315, 154, 248/680, 681, 309.1, 310, 315, 316.7, 506, 507, 509, 510, 500; 180/68.5

[56] References Cited
U.S. PATENT DOCUMENTS

| | | | |
|---|---|---|---|
| 2,363,436 | 11/1944 | Pancol | 248/505 |
| 2,432,435 | 12/1947 | Millette | 248/505 |
| 2,441,420 | 5/1948 | Karlan | 248/505 |
| 2,947,373 | 8/1960 | Wilson | 248/503 |
| 3,165,163 | 1/1965 | Holka | 248/503 |
| 3,333,810 | 8/1967 | Schlapman | 248/503 |
| 4,465,254 | 8/1984 | Murata | 248/154 |

Primary Examiner—Reinaldo P. Machado
Assistant Examiner—Alvin C. Shue
Attorney, Agent, or Firm—John C. Wiessler

[57] ABSTRACT

A battery mounting device retaining a battery both longitudinally and laterally which comprises a battery tray, a battery retainer, and a member for rigidly holding the battery in place by rigidly and adjustably holding the retainer and battery in place in relationship to the battery tray.

11 Claims, 5 Drawing Figures

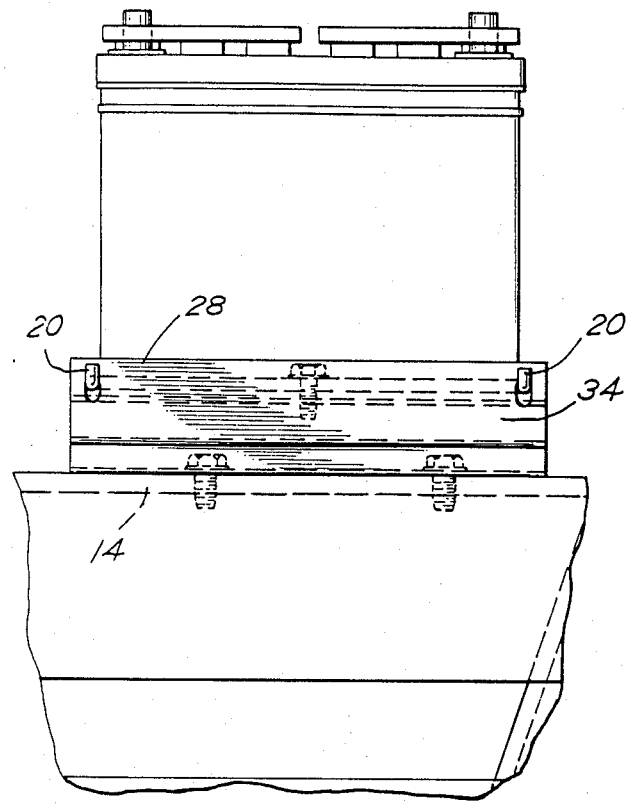
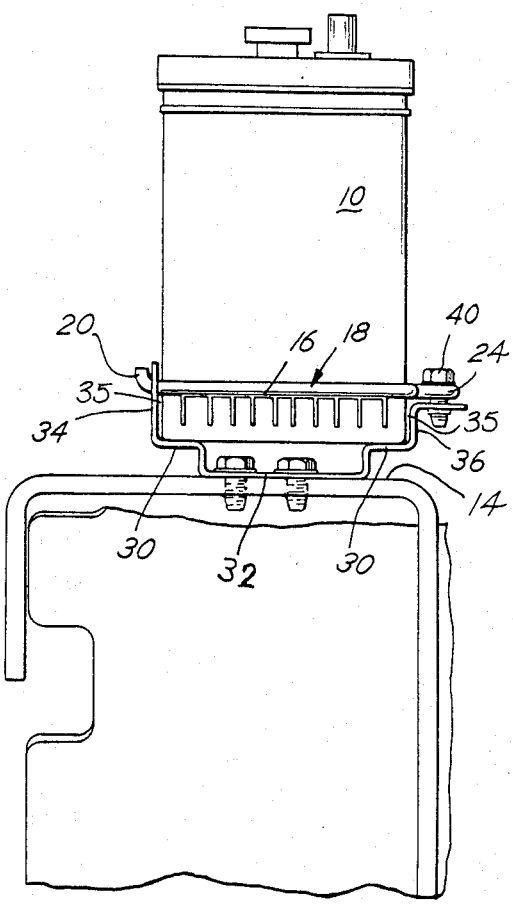
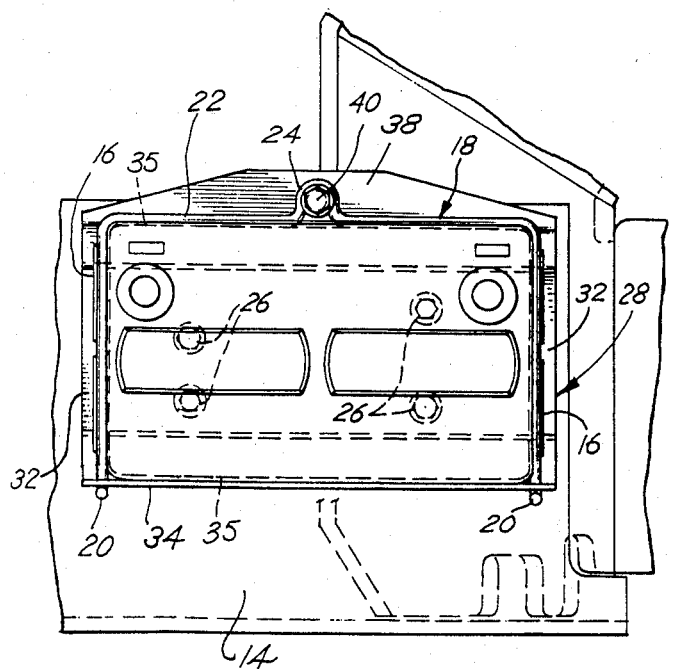

BATTERY MOUNTING DEVICE

BACKGROUND OF THE INVENTION

A variety of types of battery mounting and hold-down devices have been previously developed. Exemplary such devices are disclosed in U.S. Pat. Nos. 2,947,373, Wilson, and 3,165,163, Holka.

SUMMARY OF THE INVENTION

The principal object of the present invention is to simplify and otherwise improve upon prior battery mounting devices, particularly for mounting in vehicles. The present invention provides a low cost battery support structure which applies hold-down pressure near the bottom of the battery case by means of a minimum number of parts providing for easy access to the battery terminals and vent caps, for rapid installation and removal of the battery, and for improved reliability in a rigid battery mounting while involving less maintenance of the mounting device than heretofore.

BRIEF DESCRIPTION OF THE DRAWING

FIG. 3 is a side elevational view of my device showing a battery held in place thereon;

FIG. 4 is a front elevational view of FIG. 3; and

FIG. 5 is a plan view of FIG. 3.

DESCRIPTION OF THE PREFERRED EMBODIMENT

Figure 1:
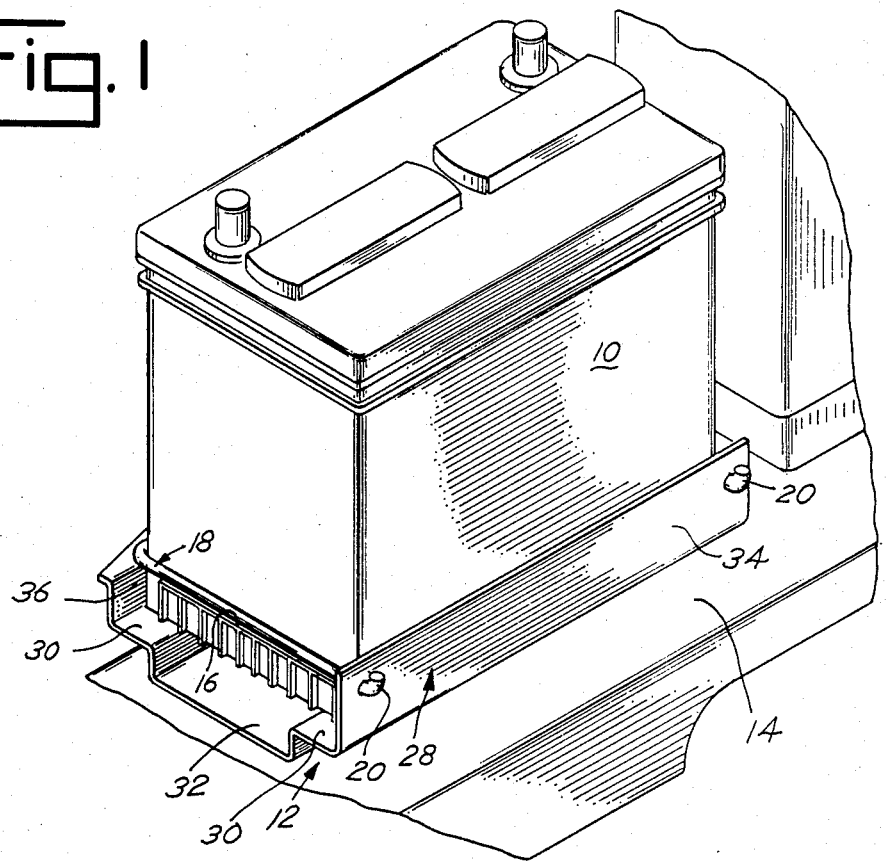
FIG. 1 is a perspective view showing a battery being held in place by my device on a side frame member of a lift truck.
Figure 2:
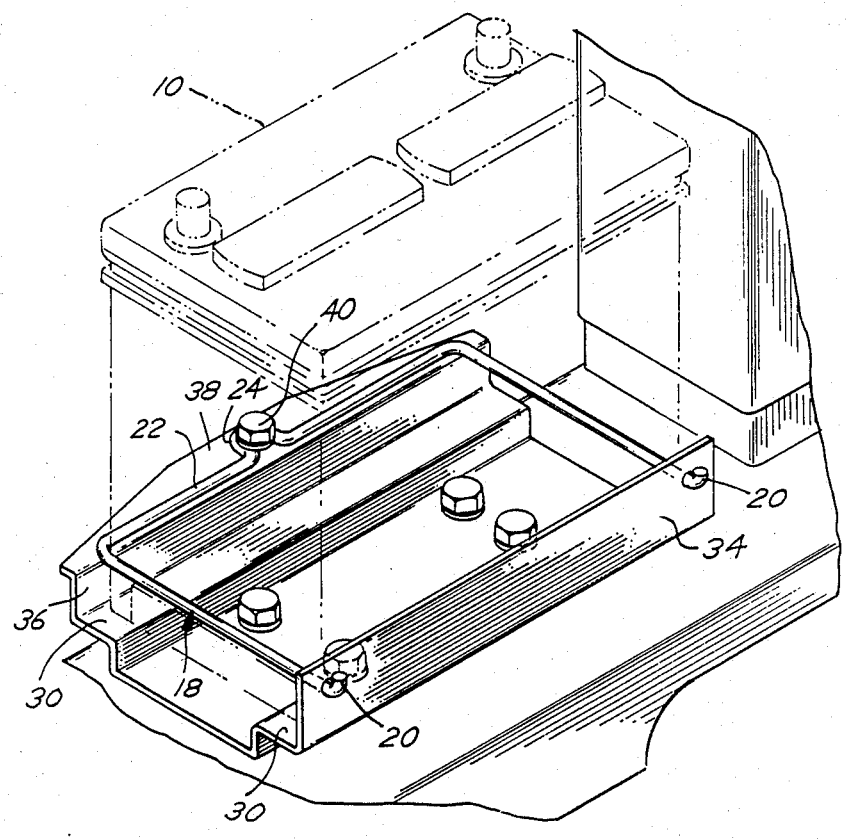
FIG. 2 is a perspective view of my device showing in broken lines a battery held in place thereon.

Referring first to FIG. 1, battery 10 is shown mounted in my device 12 on a side frame member 14 of an industrial lift truck, the latter being for exemplary purposes only.

Referring now to the remaining figures, the battery, as is usual, includes ledges 16 adjacent the bottom thereof at least at the front and rear ends which are adapted to be engaged by the legs of a generally U-shaped round bar 18 having upturned ends 20 and a base member 22 connecting the legs and having an outwardly extending loop portion 24 formed centrally of base 22.

A battery tray which is connected to the frame of the vehicle by two pair of side-by-side longitudinally spaced studs 26 comprises two operative-sided tray 28 formed as shown in FIG. 4 to provide a horizontal step 30 on each opposite side thereof for receiving the bottom of battery 10 in spaced relation to frame 14. A bottom plate portion 32 spaced below steps 30 connects steps 30. The outer side 34 of the tray comprises an upwardly projecting flange and the inner side 36 projects upwardly and outwardly, configured as best shown in FIG. 4. Side portions 34 and 36 are preferably spaced a small distance 35 from the adjacent sides of the battery case and are adapted to securely hold said sides of the battery in position in the tray whenever the U-shaped bar 18 has a loose connection with ledges 16.

Extending outwardly of inner side member 36 is a shelf 38 configured as best shown in FIG. 5; it has a tapped opening therethrough adapted to be mounted in concentric relation to the opening formed by loop 24 of the U-shaped member for receiving a threaded stud 40 which together with the structure described above is adapted to tie down the battery in rigid relationship in all directions to the battery tray.

With the battery tray bolted in position on the truck frame by studs 26 battery 10 is placed on shelf 30 following which U-shaped member 18 is mounted on ledges 16 of the battery by inserting upturned ends 20 through corresponding openings in side 34 of the tray with base end 22 of the U-shaped member somewhat elevated to enable such insertion; then, lowering the U-shaped member to the position best shown in FIG. 4 allows the upturned ends 20 to positively engage tray side 34. Threaded member 40 is then inserted through loop 24 and into the concentric opening in shelf 38. Tightening down on member 40 actuates downwardly the base 22 of the U-shaped member thereby rigidly engaging battery shelf members 16, the resulting downward holding force being resisted by reaction step 30. Thus, the battery is maintained in operation in a fully supported and rigid relationship to the truck frame and tray member solely by the U-shaped member exerting a downward force along ledges 16. If for any reason stud 40 loosens in operation or is neglected to be tightened down at the time of battery installation, the battery will be maintained in position by the closely spaced flanges 34 and 36 and by the legs of the U-shaped member, albeit not in a preferred rigid mounting as when stud 40 is tightened down as above described.

Thus, my invention provides a very compact and relatively simple battery mounting device having fewer parts than heretofore with less maintenance and complete reliability in holding in place the battery while providing for rapid battery installation and removal and ready access to the battery terminals and vent caps.

Although I have described and illustrated a preferred embodiment of my invention, it will be understood by those skilled in the art that modifications may be made in the structure, form and relative arrangement of parts without departing from the spirit and scope of the invention. Accordingly, it should be understood that I intend to cover by the appended claims all such modifications which fall within the scope of my invention.

I claim:

1. A battery mounting device for vehicles having a battery case with at least one transversely extending projection at each of two opposed sides thereof, said projections being near the bottom of said battery case, comprising a support tray supporting said battery case and adapted to be secured to a rigid member, said support tray including two only upwardly extending operative flanges, said operative flanges being located at the other opposed sides of the battery case and adapted to support said other opposed sides, and a U-shaped member surrounding said battery case on three sides thereof and engaging one of said battery tray flanges at the open side of said U-shaped member, said battery case projections being engaged by the legs of said U-shaped member, the other of said flanges having a ledge means, and means adapted to connect the base of said U-shaped member to said ledge and being adjustable to rigidly engage said U-shaped member with said battery case and said support tray.

2. A battery mounting device as claimed in claim 1 wherein the outer ends of the legs of said U-shaped member are turned so as to effect positive engagement with corresponding openings in the adjacent side of said support tray.

3. A battery mounting device as claimed in claim 1 wherein said adjustable member engages the base of said U-shaped member and a portion of the adjacent side of said support tray whereby to effect rigid holding engagement between the legs of said U-shaped member and said battery case projections.

4. A battery mounting device as claimed in claim 1 wherein said U-shaped member and said upwardly extending flanges maintain the battery case in position in the battery tray when the U-shaped member is not in said rigid engagement, said flanges being in closely spaced relation to said other opposed sides of the battery case.

5. A battery mounting device as claimed in claim 1 wherein the base of said U-shaped member includes an outwardly extending loop through which is adapted to extend the adjustable member for engaging a registrable opening in one side portion of said support tray such that said adjustable member is actuatable to effect said rigid engagement between the legs of said U-shaped member and said battery case projections.

6. A battery mounting device as claimed in claim 5 wherein said adjustable member is actuated at the base side only of said U-shaped member so as to effect an inclination of said U-shaped member toward the base thereof.

7. A battery mounting device as claimed in claim 5 wherein said adjustable member is a self-threading head cap screw member.

8. A battery mounting device as claimed in claim 5 wherein said loop is centrally located on the base side of the U-shaped member.

9. A battery mounting device as claimed in claim 1 wherein said supporting tray includes a horizontal step means on which is adapted to rest the bottom of the battery case, said step means being the reaction member when the U-shaped member effects said rigid engagement.

10. A battery mounting device as claimed in claim 9 wherein said U-shaped member together with said step means and battery case projections comprise the sole structure which maintains the battery case in rigid engagement with said support tray.

11. A battery mounting device as claimed in claim 9 wherein said U-shaped member and said upwardly extending flanges maintain the battery case in position in the battery tray when the U-shaped member is not in said rigid engagement, said flanges being in closely spaced relation to said other opposed sides of the battery case.

* * * * *